(12) United States Patent
Dellaert et al.

(10) Patent No.: US 10,529,087 B1
(45) Date of Patent: Jan. 7, 2020

(54) SYSTEM FOR A DEPTH MAPPING DEVICE

(71) Applicant: Facebook Technologies, LLC, Menlo Park, CA (US)

(72) Inventors: Frank Joris Maria Jan Dellaert, Palo Alto, CA (US); Saara Khan, Mountain View, CA (US); James Krogdahl, Menlo Park, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 29 days.

(21) Appl. No.: 15/975,281

(22) Filed: May 9, 2018

Related U.S. Application Data

(60) Provisional application No. 62/563,430, filed on Sep. 26, 2017.

(51) Int. Cl.
*H04N 5/247* (2006.01)
*G06T 7/00* (2017.01)
*G06T 7/593* (2017.01)
*G03B 37/04* (2006.01)
*G01B 11/25* (2006.01)

(52) U.S. Cl.
CPC .......... *G06T 7/596* (2017.01); *G01B 11/2518* (2013.01); *G03B 37/04* (2013.01); *H04N 5/247* (2013.01)

(58) Field of Classification Search
CPC ..... G06T 7/596; G01B 11/2518; G03B 37/04; H04N 5/247
See application file for complete search history.

(56) References Cited

U.S. PATENT DOCUMENTS

| 5,038,600 | A | 8/1991 | Friedman | |
|---|---|---|---|---|
| 7,752,771 | B2 | 7/2010 | Wu et al. | |
| 9,495,764 | B1 * | 11/2016 | Boardman | .......... G06K 9/00201 |
| 10,049,281 | B2 * | 8/2018 | Verano | ............... G06K 9/00771 |

* cited by examiner

*Primary Examiner* — Tsion B Owens
(74) *Attorney, Agent, or Firm* — Fenwick & West LLP

(57) ABSTRACT

A depth mapping device comprises a plurality of imaging components arranged among one or more rings. A depth mapping device may be designed by identifying a plurality of configurations satisfying a set of input parameters that includes a number of imaging components, each configuration indicating a different arrangement of imaging components among one or more rings. Coverages for different configuration parameter sets for the configuration are analyzed to determine a configuration parameter set associated with the configuration having a highest coverage, where the coverage is indicative of an amount of a local area viewable by a depth mapping device using the configuration and associated configuration parameter set. A target configuration having a highest coverage is selected and used to generate a depth mapping device design to be manufactured.

20 Claims, 10 Drawing Sheets

600

Identify configurations that satisfy a set of input parameters, each configuration indicating a different arrangement of cameras among one or more rings of a depth mapping rig design
610

↓

Adjust parameters of one or more configurations to adjust coverage associated with each respective configuration
620

↓

Select target configuration from the one or more configurations, based upon coverages of configurations
630

↓

Generate depth mapping rig design based upon target configuration for manufacturing depth mapping rig
640

↓

Provide depth mapping device design to user or manufacturing system
650

FIG. 6

SYSTEM FOR A DEPTH MAPPING DEVICE

CROSS REFERENCE TO RELATED APPLICATIONS

This application claims the benefit of U.S. Provisional Application No. 62/563,430, filed Sep. 26, 2017, which is incorporated by reference in its entirety.

BACKGROUND

This disclosure relates generally to depth mapping, and more specifically to a design system for a depth mapping device.

Depth mapping may be used in many virtual reality (VR) or augmented reality (AR) applications. For example, a VR or AR system may, using a depth map of a local area, be able to create a VR environment based upon the local area, display virtual objects at positions relative to real-world objects in the local area, and/or the like. In some applications, a depth map of a local area is created by captured images of the local area using one or more cameras, whereupon the depth of objects in the local area can be determined through triangulation, light pattern extraction, and/or the like. However, the created depth map of the local area may be limited by an amount of coverage of the cameras used to capture images of the local area. As such, when designing a system containing one or more cameras to be used for generating depth maps, it is desirable to be to arrange the cameras of the system into a configuration that provides a good degree of coverage of the local area.

SUMMARY

A depth mapping device comprises a plurality of cameras or projectors arranged among one or more rings. To design a depth mapping device, for a given number of imaging components (cameras or projectors), a large number of different depth mapping device configurations may be possible. A design system is used to design a depth mapping device. In order to design a depth mapping device having a high amount of coverage, a plurality of configurations satisfying a set of input parameters are identified. The input parameters may include a number of cameras or projectors, and each configuration indicates a different arrangement of the specified number of cameras or projectors among one or more rings.

Configuration parameter sets for one or more identified configurations are adjusted (e.g., by the design system) to adjust (e.g., maximize) a coverage associated with the configuration. The coverage is indicative of a collective amount of a local area viewable by the imaging components of the depth mapping device. A target configuration of the one or more configurations having a highest coverage is selected (e.g., by the design system) and used to generate a depth mapping device design to be manufactured.

In some embodiments, coverage for a depth mapping device configuration is determined based upon a virtual sphere surrounding the depth mapping device containing a plurality of sample points. For each sample point, a determination is made as to whether the sample point falls within the field of view of the imaging components of the depth mapping device. The coverage of the configuration is determined based upon a number of sample points within the field of view of the imaging components of the depth mapping device. In some embodiments, the coverage of the configuration may be calculated as an aggregation of one or more coverage levels.

In some embodiments, a method is provided. The method comprises identifying a plurality of device configurations that satisfy a set of input parameters that includes a number of imaging components, each device configuration indicating a different arrangement of the number of imaging components among one or more rings of a depth mapping device design. The method further comprises adjusting one or more parameters of one or more configurations of the plurality of configurations to adjust a coverage associated with each of the respective one or more configurations, wherein the coverage is indicative of an amount of a local area viewable through the imaging components of a configuration. The method further comprises selecting a target configuration from the one or more configurations, based in part on a coverage associated with the target configuration. The method further comprises generating a depth mapping device design based upon the target configuration, wherein manufacture of a depth mapping device is based in part on the depth mapping device design. In some embodiments, a computer-readable storage medium may include steps to execute the method. And in some embodiments, the design system may include one or more modules that are configured to perform the steps of the method.

BRIEF DESCRIPTION OF THE DRAWINGS

FIG. 6 illustrates a flowchart of a process for producing a design for a depth mapping device, in accordance with some embodiments.

Figure 1A:
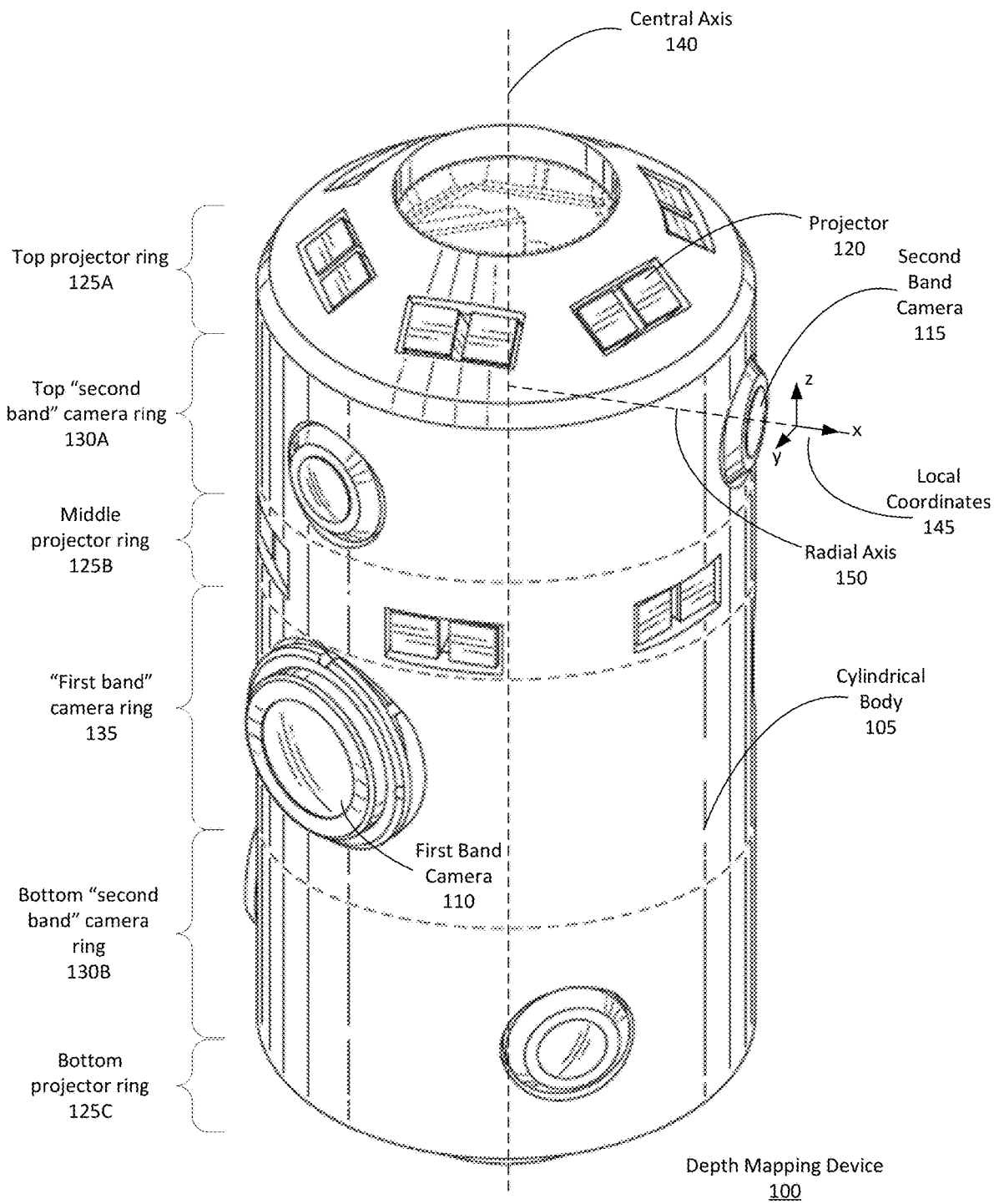
FIG. 1A illustrates an isometric view of the depth mapping device, in accordance with some embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Depth mapping may be used in many artificial reality applications for creating virtual objects and virtual environments, and/or augmenting a real-world environment with displayed virtual objects. For example, when the depth of objects in a local area is known, an AR system may be able to display to a user virtual objects that appear at specific locations in the local area relative to one or more real-world objects. In social VR applications, users may be able to create their own virtual environments based upon depth mapped real-world environments. For example, a first user within a first local area may use a depth mapping device placed within the first local area to generate a depth map of the first local area, which can be used to create a virtual environment that is transmitted to a second user located within a second local area, allowing the second user to interact with the first user within a virtual recreation of the first local area.

In order to be able to generate a more complete depth map of a local area, it is generally desirable for the depth mapping device to be able to achieve a high degree of coverage of the local area (e.g., substantially 360° coverage). In some embodiments, a depth mapping device comprises a plurality of imaging components, such as cameras configured to capture images of the local area, and/or projectors configured to project light patterns over the local area.

A given set of imaging components for a depth mapping device may have different configurations that result in different amounts of coverage. A design system may receive a set of input parameters for designing a depth mapping device (e.g., an input set of imaging components specifying a number and/or type of imaging components), and determine a configuration of the depth mapping device that is able to achieve a good degree of coverage using the input set of the imaging components.

FIG. 1A illustrates an isometric view of the depth mapping device 100, in accordance with some embodiments. The camera system 100 captures images and/or audio information of a local area surrounding the depth mapping device 100. In some embodiments, the captured images and/or audio information may be sued to generate 3D-360 degree content. The 3D-360 degree content is media content (e.g., an image, a video, audio information, or some combination thereof) associated with a 360 degree field of view of the camera system and which may be rendered in 3D. The local area is the environment that surrounds depth mapping device 100. For example, the local area may be a room that the depth mapping device 100 is inside, or the depth mapping device 100 may be outside and the local area is an outside area that is visible to the depth mapping device 100.

The depth mapping device 100 comprises a substantially cylindrical body 105 containing a plurality of imaging components arranged in one or more "rings." An imaging component is a component of the depth mapping device 100 involved in depth mapping and/or image capture. For example, an imaging component may refer to a camera configured to capture images of a portion of a local area over a particular wavelength band, and/or a projector configured to project a light pattern of a particular wavelength band over a portion of the local area. For example, the imaging components may comprise first band cameras 110 (i.e., cameras configured to capture images in a first wavelength band), one or more second band cameras 115 (i.e., cameras configured to capture images in a second wavelength band different from the first wavelength band), and/or one or more projectors 120 configured to project light patterns in the first and/or second wavelength bands. In some embodiments, the first band may correspond to visible light, while the second band may correspond to IR light.

The one or more first band cameras 110 comprise cameras configured to capture images of a local area over a first wavelength band, such as over a visible light spectrum. In some embodiments, the first band cameras 110 are color red-green-blue (RGB) cameras configured to capture images in the visible RGB color space. In other embodiments, other types of cameras able to capture images within the visible spectrum may include monochrome cameras configured to capture monochrome grayscale images of the local area. A first band camera of the one or more first band cameras 110 includes a sensor, a lens system, and is coupled to a camera controller. The sensor is an electrical device that captures light using an array of photo-sensitive pixels, wherein each pixel converts light into an electronic signal. Sensors can have varying features, such as resolution, pixel size and sensitivity, light sensitivity, type of shutter, and type of signal processing. The lens system is one or more optical elements of a camera that facilitate focusing light onto the sensor. A field of view ranging from ~50 to 120 degrees is generally referred to as a wide field of view (WFOV), and a field of view larger than 120 degrees is generally referred to as a fish eye field of view. In the embodiment of FIG. 1, the lens assembly has a WFOV. The lens assemblies of the one or more first band cameras 110 are configured to have wide coverage of the local area and provide sufficient overlap between fields of view of the one or more first band cameras 110 such that high quality 3D-360 degree images can be created. Lenses have features that can be fixed or variable, such as the focus and the aperture, may have varying focal lengths, and may be covered with an optical coating. Some embodiments may have lenses that are interchangeable, such that a first lens can be removed from the camera and a second lens can be coupled to the camera. In some embodiments, one or more of the first band cameras 110 may have a microphone to capture audio information. The microphone can be located within the camera or may located external to the camera.

The one or more second band cameras 115 comprise cameras configured to capture images of the local area over a second wavelength band that is different from the first wavelength band corresponding to the first band cameras 110. In some embodiments, the second band cameras 115 comprise IR cameras configured to capture images of the local area within the IR spectrum. A second band camera of the one or more second band cameras 115 includes a sensor, a lens system, and is coupled to a camera controller (in some cases a same camera controller for the one or more first band cameras 110). In the embodiment of FIG. 1, the lens assembly of a second band camera has a WFOV. The lens assemblies of the one or more second band cameras 115 are configured to have wide coverage of the local area and provide sufficient overlap between fields of view of the one or more second band cameras 115 to facilitate capture of information for depth mapping. In some embodiments, one or more of the second band cameras 115 may have a microphone to capture audio information. The microphone can be located within the camera or may located external to the camera.

In some embodiments, other types of cameras, such as RGB-infrared (RGBI) cameras able to capture images in both the visible and IR bands may be used. In some embodiment, an RGBI camera is used to determine depth information (e.g., based upon projected IR patterns by an IR projector), as well as determine color information in the RGB color space. Accordingly the one or more first band cameras 110 and/or the one or more second band cameras 115 may include one or more RGBI cameras.

The camera controller is able to determine exposure settings (e.g. aperture, gain, shutter) for the one or more first band cameras 110 and/or the one or more second band cameras 115 (e.g., based on light incident on the sensors). In some embodiments, the camera controller may provide a global shutter such that each of the one or more first band cameras 110 have a same shutter speed. Similarly, the camera controller may provide a global shutter such that each of the one or more second band cameras 115 have a same shutter speed. In cases where the depth mapping device 100 includes one or more RGBI cameras, the camera controller instructs the one or more RGBI cameras to capture images in a visible band, an infrared band, or both. E.g., the camera controller may instruct an RGBI to capture 3 visible image frames for each infrared image frame.

The one or more projectors 120 are configured to project a light pattern over a portion of the local area. The projected light pattern may correspond to a particular wavelength range. For example, the projectors 120 illustrated in FIG. 1A may correspond to IR projectors configured to project IR light patterns over portions of the local area. In some embodiments, the IR light patterns projected by the projectors 120 are detectable in images captured by one or more of the second band cameras 115 (e.g., where the light patterns projected by the projectors 120 fall on objects within the local area that are within the fields of view of the second band cameras 115). The detected light patterns may be used to determine depth information for objects within the local area for generating a depth map. In other embodiments, the projectors 120 may be configured to project visible light patterns that are detectable in images captured by the first band cameras 110.

As used herein, a ring may refer to a section of the substantially cylindrical body 105 that spans a horizontal circumference of the body 105, onto which one or more imaging components are mounted. For example, the depth mapping device 100 illustrated in FIG. 1 comprises six rings, comprising, from top to bottom, a top projector ring 125A, a top "second band" camera ring 130A, a middle projector ring 125B, a "first band" camera ring 135, a bottom "second band" camera ring 130B, and a bottom projector ring 125C. While FIG. 1A illustrates each ring of the depth mapping device 100 as comprising only one type of imaging component, in other embodiments, different types of imaging components may be arranged on the same ring. Additionally, in other embodiments, a depth mapping device may include some other number of rings.

In the illustrated embodiment, the top, middle, and bottom projector rings 125A, 125B, and 125C each comprise 12 projectors 120 arranged in 6 evenly spaced groups of two over the circumference of the cylindrical body 105. For example, each group of two projectors 120 of the projector rings 125A, 125B, and 125C is separated from adjacent groups of projectors 120 within the ring by 60°. Each of the projectors 120 of each of the projector rings 125A, 125B, and 125C is configured to project a light pattern (e.g., an IR pattern) over a respective portion of the local area of the depth mapping device 100, based upon the position and orientation of the projector 120 on the depth mapping device 100. As illustrated in FIG. 1A, the top and bottom portions of the cylindrical body 105 of the depth mapping device 100 may slant inwards (e.g., towards a central axis 140), such that the projectors 120 of the top projector ring 125A and bottom projector ring 125C are tilted upwards and downwards relative to the central axis 140, respectively. On the other hand, the projectors 120 of the middle projector ring 125B are oriented horizontally. In other embodiments, the projectors 120 of the projector rings 125A, 125B may be tilted upwards or downwards independent of the slant of the cylindrical body 105 (or lack thereof).

The top and bottom "second band" camera rings 130A and 130B each comprise 3 second band cameras 115 evenly spaced over the circumference of the cylindrical body 105, such that the cameras within each ring are separated by 120°. Each second band camera 115 of each "second band" camera ring 130A and 130B is configured to capture images of a portion of a local area corresponding to a respective field of view. In some embodiments, the fields of view of each of the second band cameras 115 overlaps with at least a portion of a projection field of one or more projectors 120, such that a light pattern projected by the one or more projectors 120 onto objects within the fields of view of the second band cameras 115 can be extracted from the images captured by the second band cameras 115. The extracted light patterns can be used to generate depth information for objects in the local area, in order to construct a depth map of the local area. In addition, in some embodiments, the second band cameras 115 may also capture light patterns projected onto the local area by a separate projector system. Furthermore, in some embodiments, if the fields of view of two or more second band cameras 115 overlap, depth information may be determined from the captured images of the respective second band cameras 115 using stereo triangulation. In some embodiments, one or more of the second band cameras 115 may be used to determine depth information using time of flight (ToF) techniques.

The "first band" camera ring 135 comprises 2 first band cameras 110 arranged evenly spaced over the circumference of the cylindrical body 105 (e.g., separated by 180°). In some embodiments, the images captured by the first band cameras 110 are used to generate depth information (e.g., using ToF and/or triangulation), supplement depth information determined using the projected light patterns of the projectors 120 and images captured by the second band cameras 115 (e.g., by identifying boundaries between objects), and/or provide color or texture information corresponding to objects in the local area. For example, after a depth map of the local area is generated based upon the projected light patterns of the projectors 120 extracted from images captured by the second band cameras 115, color and texture information determined from the images captured by the first band cameras 110 can be combined with the depth information of the depth map to construct virtual objects for populating a virtual representation of the local area.

As illustrated in FIG. 1A, each imaging component of the middle projector ring 125B, "second band" camera rings 130A and 130B, and "first band" camera ring 135 of depth mapping device 100 is oriented facing directly away from the central axis 140 of the device 100. For example, FIG. 1A illustrates a local coordinate system 145 relative to a particular second band camera 115. An x-axis of a local coordinate system of an imaging component corresponds to an optical axis of the imaging component. For example, the x-axis of the coordinate system corresponds to an optical axis of the second band camera 115. In the illustrated embodiment, the x-axis corresponds to a radial axis 150 that is perpendicular to the central axis 140 of the device 100. In the illustrated embodiment, the z-axis is parallel to the central axis 140. A radial axis is an axis that is perpendicular to the central axis 140. In some embodiments, a radial axis may overlap and/or be parallel to an optical axis of an imagining component. In some embodiments, a vertex of a local coordinate system for an imaging component lies on an associated radial axis. Note that while the local coordinate system 145 is illustrated outside of the second band camera 115, in other embodiments, the local coordinate system 145 may be positioned elsewhere. For example, the vertex of the local coordinate system 145 may be at the center of an exterior lens of the second band camera 115, located at a nodal point of the second band camera 115, some other location along the radial axis 150, or some other position.

Although only one local coordinate system 145 is illustrated in FIG. 1A, it is understood that different imaging components on the device 100 may each be associated with respective local coordinate systems. And that one or more imaging components may be associated with their own respective radial axis. The second band camera 115 associated with the local coordinate system 145 illustrated in FIG. 1A faces directly away (i.e., an optical axis of the camera is perpendicular to the central axis 140) from the central axis 140 such that the x-axis of its local coordinate system 145 is aligned with the radial axis 150. However, in other embodiments, the orientation of one or more imaging components of the depth mapping device 100 may be rotated away from having the x-axis overlap with the radial axis. For example, the projectors 120 of the top projector rings 125A illustrated in FIG. 1A are rotated counterclockwise by a particular angle about the y axis relative to their respective radial axes. Accordingly, an x-axis for a projector of the projectors 120 does not overlay its corresponding radial axis and is instead at some angle to the radial axis. In other embodiments, one or more imaging components may have some other amount of rotation about the y axis, the z axis, the x-axis, or some combination thereof. Moreover, the rotation about any axis may be positive or negative. In some embodiments, each imaging component within a particular ring is oriented the same way relative to the central axis 140 of the device 100. As used herein, the amount of y-axis rotation of an imaging component relative to an associated radial axis may be referred to as the "tilt angle" of the imaging component. For example, in FIG. 1A, the second band cameras 115 have a tilt angle of 0°, while the projectors 120 of the top projector ring 125A have a positive tilt angle (e.g., 40°).

Figure 1B:
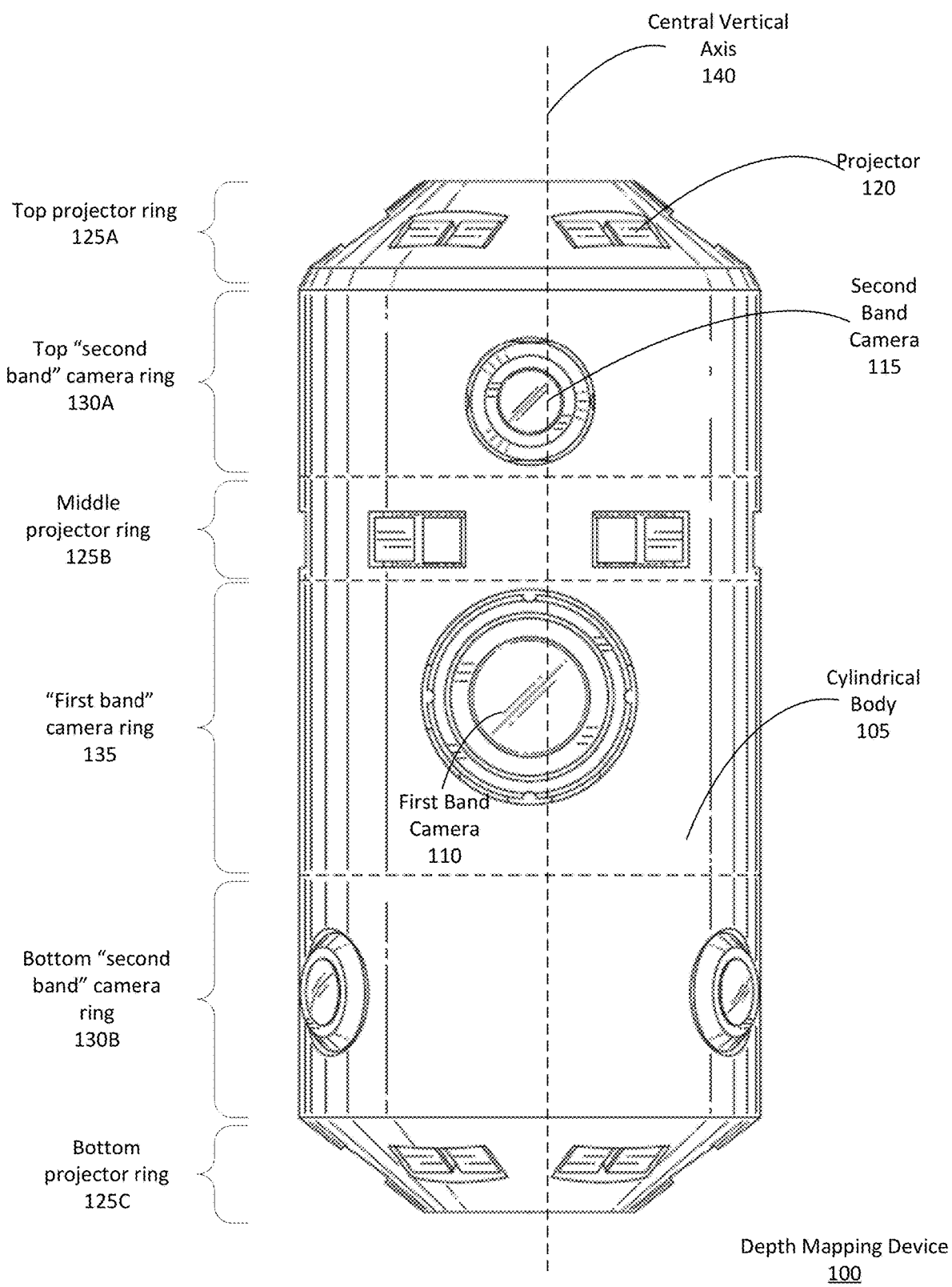
FIG. 1B illustrates a side view of the depth mapping device of FIG. 1A.

FIG. 1B illustrates a side view of the depth mapping device 100 of FIG. 1A. The view of the depth mapping device 100 illustrated in FIG. 1B shows a clearly view of the projectors 120 of the bottom projector ring 125C, which may be tilted downwards by an equivalent amount in comparison to the upwards tilt of the projectors 120 of the top projector ring 125A In some embodiments, the depth mapping device 100 may be a portable device. For example, a user may place the depth mapping device 100 within a local area (e.g., within a room) in order to determine depth information for the local area, which is used to create an artificial reality environment used in an artificial reality application.

The depth mapping device 100 illustrated in FIGS. 1A and 1B represents one depth mapping device design that may be implemented with a given set of imaging components. However, for any given set of imaging components, multiple depth mapping device designs may be possible. For example, different depth mapping device designs may contain different numbers of imaging components arranged over different rings, different order of rings, different orientation of imaging components, and/or the like, and may each have a different amount of coverage based upon the placement of the imaging components on the depth mapping device. A user may use a design system, described below in relation to FIGS. 2-7, in order to generate a depth mapping device design using a given set of imaging components that is able to achieve good amount coverage of a local area.

Design System for Depth Mapping Device

A depth mapping device includes one or more imaging components that each are associated with a respective coverage of a local area. As used herein, the coverage of a depth mapping device refers to an amount of a local area surrounding the depth mapping device that is within the coverage of at least one imaging component of the depth mapping device. For example, portions of the local area that may be captured by an RGB camera of the depth camera device may be considered to be within the coverage of the RGB camera. In some embodiments, portions of the local area of the depth mapping device to be considered within the coverage of an IR camera if the portion is within the field of view of the IR camera and is also within a projection field of at least one IR projector (e.g., a projector of the depth mapping device, or of an external system), such that the portion of the local area has an IR pattern projected over it that can be extracted from images captured by the IR camera. In some embodiments, separate coverages may be determined for a depth mapping device, indicating coverages by different types of imaging components of the depth mapping device (e.g., an RGB coverage and a separate IR coverage).

The coverage of a particular depth mapping device may depend upon the configuration of the depth mapping device. As used herein, a depth mapping device configuration may refer to an arrangement of imaging components contained within a depth mapping device. For example, a depth mapping device configuration may indicate a number of rings of the depth mapping device, and a number and type of imaging components in each ring. Each configuration is further associated with a configuration parameter set containing parameter values that specify dimensions, spacings, and orientations of the imaging components and rings of the depth mapping device. For example, the configuration parameter set for a configuration may specify an orientation of the imaging components within each ring, dimensions of the depth mapping device (e.g., diameter of the cylindrical body, vertical distance between rings, etc.), distance between rings, angular offset of imaging components on different rings, and/or the like. When designing a depth mapping device, a user may wish to be able to determine, for a given set of imaging components, a configuration that achieves the greatest amount of coverage using the set of imaging components.

Figure 2A:
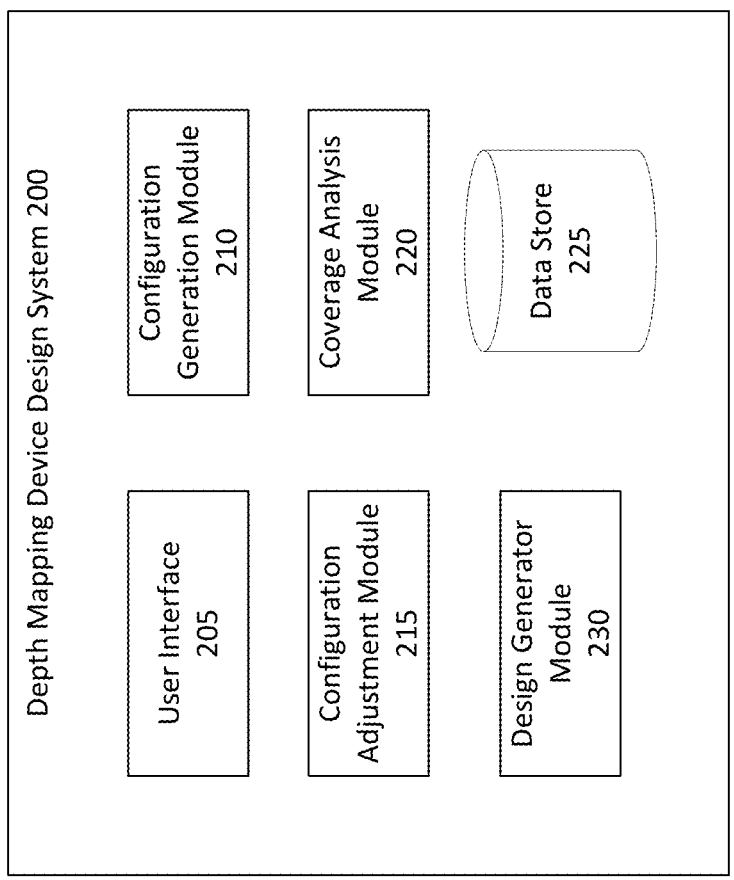
FIG. 2A is a block diagram of a design system for designing a configuration for a depth mapping device, in accordance with some embodiments.

FIG. 2A is a block diagram of a design system 200 for designing a configuration for a depth mapping device, in accordance with some embodiments. Some embodiments of the design system 200 have different components than those described here. Similarly, the functions can be distributed among the components in a different manner than is described here. The design system 200 comprises a user interface 205, a configuration generation module 210, a configuration parameter module 215, a coverage analysis module 220, a design generator module 230, and a data store 225.

The design system 200 is usable by a user to generate a design for a depth mapping device that has good coverage, based on a given set of input parameters. The user interface 205 comprises interface elements usable by a user of the design system 200 to provide input parameters for generating the depth mapping device design. The input parameters may comprise one or more desired attributes or restrictions for the depth mapping device design. For example, the input parameters may comprise a number and/or type of imaging components to be included in the depth mapping device (e.g., number of projectors, number of first band cameras, number of second band cameras, etc.). In some embodiments, the input parameters may specify a specific number of each type of imaging component, a maximum or minimum number of imaging components, specific models of imaging component to be used, and/or the like.

The input parameters may further specify one or more properties of a type of imaging component that may be used in the depth mapping device. For example, for a particular type of camera, the input parameters may specify a field of view of the camera, image capture properties of the camera (e.g., detectable wavelength range, image resolution, capture rate, and/or the like), physical dimensions of the camera, etc. In some embodiments, properties of known types of imaging components may be stored in the data store 225, allowing for the design system 200 to retrieve the properties of known imaging components identified by the input parameters, without requiring their respective properties to be input by the user repeatedly.

In some embodiments, the input parameters may specify one or more restrictions on the arrangement of imaging components on the depth mapping device. For example, the input parameters may specify a restriction on the number of rings to be included on the depth mapping device and/or the number of imaging component that may be arranged on one or more of the rings of the depth mapping device (e.g., maximum/minimum number of imaging components on a ring). In some embodiments, the input parameters may further specify one or more parameters relating to the spacing and/or orientation of imaging components of the depth mapping device (e.g., restrictions on tilt angles for imaging components on certain rings).

In some embodiments, the input parameters may specify one or more dimensions of the depth mapping device to be designed. For example, the input parameters may specify one or more restrictions on the overall dimensions of the device, one or more restrictions on the distances between rings of the device, and/or the like.

In addition, the input parameters may specify a type of coverage to be achieved by the depth mapping device. For example, although the depth mapping device 100 as illustrated in FIGS. 1A and 1B is configured to achieve substantially 360° spherical coverage, in some cases the user may wish to design a depth mapping device having less than 360° coverage (e.g., 180° hemispherical coverage). An example of a depth mapping device having 180° hemispherical coverage is described in greater detail below with regards to FIG. 7.

In some embodiments, the input parameters may further specify one or more parameters for determining coverages with a depth mapping device design. For example, the input parameters may specify a number of sample points used to determine coverage, sample point distributions and/or weights, weights for different coverage levels, and/or the like. Parameters for determining coverage are described in greater detail below in relation to FIG. 5.

The configuration generation module 210 receives the input parameters provided by the user through the user interface 205, and identifies possible configurations for a depth mapping device based upon the received input parameters. Each identified configuration specifies an arrangement of imaging components over one or more rings that satisfies the set of received input parameters.

To identify the possible configurations, the configuration generation module 210 may determine a possible number of imaging components and a possible number of rings that satisfy the input parameters, and generate different arrangements of imaging components on rings that satisfy the input parameters. For example, if the user specifies that a depth mapping device should have 18 IR projectors and 6 IR cameras, the configuration generator may identify a first configuration having three rings each having six IR projectors and two rings each having three IR cameras, and a second configuration having three rings each having six IR projectors and three rings each having two IR cameras. In some embodiments, a Pascal triangle may be used in determining possible configurations based upon a number of imaging components and/or rings. The use of Pascal triangles to determine possible configurations for a given number of imaging components and rings is discussed in greater detail below with regards to FIGS. 2B and 2C.

In some embodiments, a depth mapping device configuration is expressed using one or more vectors indicating a distribution of imaging components over one or more rings. Using this notation, each element within the vector corresponds to a rings, the order of which may correspond to a particular ordering of the rings (e.g., top to bottom), while the individual values of the vector elements indicate the number of imaging components on a respective ring. For example, in the first configuration discussed above, the projectors are arranged [6, 6, 6] (indicating that the projectors are arranged into 3 rings each containing 6 projectors), while the second band cameras are arranged [3, 3] (indicating that the second band cameras are arranged into 2 rings each having 3 second band cameras). In some embodiments, each array for a component type may also indicate the rings of the configuration that do not contain that component. For example, in the first configurations, the projectors are arranged [6, 0, 6, 0, 0, 6], while the second band cameras are arranged [0, 3, 0, 0, 3, 0] and the first band cameras are arranged [0, 0, 0, 2, 0, 0], indicating that the depth mapping device comprises a total of six rings, including three projector rings, two second band camera rings, and one first band camera ring.

In some embodiments, the input parameters may specify ranges of imaging components and/or rings to be used in the depth mapping design (e.g., between 4 and 6 of a first type of imaging component distributed over between 2 and 3 rings), whereupon the configuration generation module 215 may generate different combinations of possible numbers of imaging components and rings, and identify possible configurations for each different combination.

In some embodiments, the generated configurations are limited based upon one or more rules. For example, a rule may require that each ring of the configuration contain at least two imaging components, that each ring of the configuration only contain one type of imaging component, and/or the like. Any identified configurations that violate any of the one or more rules may be automatically discarded. In some embodiments, the user may, via the user interface 205, override one or more rules (e.g., allow for configurations having one imaging component on a ring, for a ring to be able to contain more than one type of imaging component, and/or the like), and/or specify additional rules.

In some embodiments, the configuration generation module 210 may also analyze the input parameters provided by the user to determine if there are any conflicts within the input parameters that would prevent the generation of the depth mapping device design. For example, if the input parameter specifies a desired distance between rings for the depth mapping device that is less than a dimension of a type of imaging component specified by the input parameters to be included in the rings, a depth mapping device design may not be able to be generated. The configuration generation module 210 may compare one or more dimensions specified by the input parameters with one or more dimensions associated with a type of imaging component (e.g., as input by the user through the user interface 205 and/or retrieved from the data store 225), in order to determine whether a configuration satisfying the input parameters is physically possible, or if there is a conflict. In some embodiments, this function is performed by the configuration adjustment module 215 (discussed below).

The configuration adjustment module 215 receives the configurations identified by the configuration generation module 210, and, for each configuration, determines one or more candidate configuration parameter sets. As discussed above, a configuration specifies a distribution of imaging components between different rings, while a configuration parameter set refers to a set of parameters for the configuration specifying specific dimensions, spacings, and orientations for a depth mapping devices that uses the configuration. For example, a configuration parameter set for a particular configuration may specify a spacing of imaging components within a ring of the configuration (e.g., evenly spaced over the ring, evenly spaced groups of two, and/or the like), distance between rings of the configuration, angular offset between rings of the configuration, orientation or tilt of imaging components on a ring of the configuration, and/or the like. As such, a given configuration for a depth mapping device design may have different possible configuration parameter sets that would result in different dimensions and orientations for the depth mapping device. Examples of configuration parameter sets for an identified configuration are described in greater detail below in relation to FIGS. 3 and 4.

The coverage of a depth mapping device design is based upon the placement and orientation of imaging components on the device. For a given configuration, the amount of coverage that can be achieved by a depth mapping device using the configuration thus may vary for different configuration parameter sets. As such, in order to evaluate the coverage of different configurations for producing a depth mapping device design, configuration adjustment module 215 determines one or more candidate configuration parameter sets for each configuration.

In some embodiments, the configuration adjustment module 215 determines the one or more candidate configuration parameter sets by first identifying one or more parameter ranges. In some embodiments, the one or more parameter ranges may be based upon the received input parameters, one or more default ranges, or a combination thereof. For example, in some embodiments, the tilt angle of imaging components on a particular ring may be restricted to a certain range (e.g., between 0° and 60°). The configuration adjustment module 215 may step through the range of possible values (e.g., intervals of 10°) for the parameter to determine a plurality of different candidate configuration parameter sets. In some embodiments, the candidate configuration parameter sets may be generated based upon parameters expected to have a larger effect on coverage. For example, in some embodiments, tilt of imaging components on a ring may be expected to have a larger effect on coverage compared to distance between rings. As such, the identified candidate configuration parameter sets may have a large variance in tilt angle of imaging components, with smaller or no variance in distance between rings.

In some embodiments, because coverage is generally expected to vary smoothly as the value of a parameter is changed, the configuration generation module 215 may generate a default candidate configuration parameter set for the configuration, and utilize a continuous optimization method to determine a set of configuration parameters that maximizes an amount of coverage. In some embodiments, the default candidate configuration parameter set is may be based on one or more predetermined settings (e.g., equal spacing between rings of the configuration, equal distribution of imaging components on each ring, etc.).

The coverage analysis module 220 receives one or more candidate configuration parameter sets for a configuration determined by the configuration adjustment module 215, and determines a coverage associated with each candidate configuration parameter set. The coverage of a candidate configuration parameter set corresponds to a coverage that can be achieved by a depth mapping device that adheres to the configuration and candidate configuration parameter set.

In some embodiments, the coverage analysis module 220 determines a coverage associated with a candidate configuration parameter set by generating a virtual sphere (or other virtual object based upon the desired coverage to be achieved, such as a virtual hemisphere for 180° hemispherical coverage) around a virtual depth mapping device adhering to the candidate configuration parameter set, and determining a portion of the virtual sphere that is within the coverage of the imaging components of the depth mapping device. In some embodiments, the coverage analysis module 220 determines different levels of coverage based upon different levels of overlap of the files of view of the imaging components, and aggregates the levels of coverage (e.g., using a weighted sum) to determine the overall overage for the candidate configuration parameter set. The process for determining coverage is greater detail below in relation to FIG. 5. In some embodiments, coverage determination is based upon one or more user inputs (e.g., a number of samples to be used when determining coverage, weight or distribution of samples, etc.). In some embodiments, the virtual sphere has a radius large enough relative to the size of the depth mapping device (e.g., 100$m$) that coverage of the depth mapping device is expected to remain relative constant for different distances around the radius of the virtual sphere. In other embodiments, multiple virtual spheres having different radiuses may be used to analyze coverage of the depth mapping device configuration. For example, the fields of view of two cameras in a particular configuration may only overlap past a threshold distance from the depth mapping device (thus providing 2× coverage for certain portions of the local area beyond the threshold distance). As such, coverage of the depth mapping device configuration may be analyzed based on a first virtual sphere having a radius greater than the threshold distance, and a second virtual sphere having a radius less than the threshold distance.

As such, the configuration adjustment module 215 and coverage analysis module 220 work together to determine, for a particular configuration identified by the configuration generation module 210, a plurality of candidate configuration parameter sets and a coverage associated with each of the candidate configuration parameter sets. The configuration adjustment module 215 or the coverage analysis module 220 may then select a configuration parameter set of the candidate configuration parameter sets having the highest coverage, and associate the selected configuration parameter set and its determined coverage with the configuration.

In some embodiments, the configuration adjustment module 215 generates a first group of candidate configuration parameter sets, whereupon the coverage analysis module 220 determines an overall coverage for each candidate configuration parameter set of the group. In response, the configuration adjustment module 215 may generate one or more additional candidate configuration parameter sets based upon one or more candidate configuration parameter sets of the first group having the highest coverage. For example, the one or more additional candidate configuration parameter sets may have parameter values similar to the one or more candidate configuration parameter sets of the first group having the highest coverage. In some embodiments, the configuration adjustment module 215 may reduce a parameter value interval or granularity for generating the additional configuration parameter sets (e.g., reducing the interval for tilt angle from intervals of 10° to intervals of 1° around a tilt angle found to result in a highest amount of coverage). This may allow for the coverage analysis module 225 to more precisely determine a configuration parameter set for the configuration that results in higher coverage for the configuration. The coverage analysis module 220 determines the coverages for each of the additional candidate configuration parameter sets, and determines if any of the additional candidate configuration parameter sets have higher coverage.

Once the coverage analysis module 220 determines coverages for each of one or more candidate configuration parameter sets for a particular configuration, the configuration may be associated with the configuration parameter set that provides for the highest coverage.

Responsive to each configuration being associated with a particular configuration parameter set and coverage, the coverage analysis module 220 may select a particular configuration based upon the associate coverages. For example, the coverage analysis module 220 may select a configuration associated with a coverage that exceeds a threshold value, the configuration having the highest coverage, and/or the like.

In some embodiments, the configuration adjustment module 215 and/or the coverage analysis module 220 determine a preliminary score for each identified configuration, and identify candidate parameter sets for only a subset of the identified configurations based upon the preliminary score. By reducing the number of configurations, a number of candidate configuration parameter sets for different configurations that need to be identified and analyzed can be reduced. In some embodiments, the preliminary score for a configuration may be calculated based upon one or more imaging component parameters (e.g., FOV). In some embodiments, a preliminary score for a configuration may be calculated based upon a coverage for a default configuration parameter set for the configuration (e.g., all imaging devices even distributed over respective rings, 0° tilt angle, all rings evenly spaced etc.). The coverage may be calculated using a reduced number of sample points, based on only a 1× coverage level (discussed in greater detail below), and/or the like. The subset of configurations may comprise a predetermined number of the identified configurations having the highest preliminary scores, all identified configurations having a preliminary score above a threshold level, and/or the like. Once a subset of the identified configurations has been selected, the configuration adjustment module 215 and coverage analysis module 220 may identify candidate configuration parameter sets for the subset of configurations, in order to optimize the amount of coverage that can be achieved by the configurations. A configuration having a coverage satisfying a threshold value or having a highest coverage of the subset of configurations may be selected as described above.

The design generator module 230 receives the selected configuration and associated configuration parameter set, and generates a depth mapping device design based upon the selected configuration and configuration parameter set. The depth mapping device may be transmitted to the user or to a manufacturing system, and used to manufacture a depth mapping device.

The data store 225 stores data used by the configuration generation module 210, configuration adjustment module 215, coverage analysis module 220, and design generator module 230 to determine coverages for different configurations that satisfy the input parameters received via the user interface 205. For example, the data store 225 may store the set of input parameters received from the user via the user interface 205. In addition, the data store 225 may be able to store previously received sets of input parameters that may be accessed and/or modified by the user through the user interface 205.

In some embodiments, the data store 225 stores imaging component parameters corresponding to different types of imaging components (e.g., cameras, projectors). The imaging component parameters may comprise image type information (e.g., RGB or IR), field of view information, and dimensional data for each of one or more different types of cameras that may be used in a depth mapping device. As such, in response to a user identifying, via the user interface 205, one or more types of imaging components to be used in a depth mapping device, the configuration generation module 210, configuration adjustment module 215, and/or coverage analysis module 225 may retrieve from the data store 225 the stored imaging component parameters corresponding to the specified imaging component types, in order to generate a configuration and evaluate a coverage of the configuration containing the specified types of imaging components, without requiring the user to provide the parameters of each type of imaging component.

In some embodiments, the data store 225 may store configuration rules indicating one or more parameter restrictions associated with generated configurations. For example, in some embodiments, the angle orientation of imaging components (e.g., the range at which the imaging components can be tilted upwards or downwards) in a configuration may be restricted based upon which ring the imaging component is a part of Other types of configuration rules may specify a minimum or maximum number of imaging components per ring, restrictions on the number of rings, whether a single ring may contain different types of imaging components, and/or the like.

In some embodiments, the data store 225 may further store one or more predetermined configurations. The predetermined configurations may correspond to certain configurations previously identified by the configuration generation module 210 and their respective coverages as determined by the configuration adjustment module 215 and coverage analysis module 220. In some embodiments, when the configuration generation module 210 identifies a configuration satisfying a received set of input parameters that matches a previously identified configuration, the design system 200 may retrieve stored coverage information associated with the identified configuration from the data store, without needing the configuration adjustment module 215 and coverage analysis module 220 to repeatedly determine coverage information for the configuration by identifying candidate configuration parameter sets and determining coverages for the candidate configuration parameter sets.

In some embodiments, the functions of the design system 200 may be implemented on different components. In some embodiments, the different components are remote from each other, and communicate over a network (e.g., internet, local area network, wide area network, etc.). For example, in some embodiments, the user interface 205 is implemented on a user device such as a personal computer or mobile device, while one or more of the configuration generation module 210, configuration adjustment module 215, and coverage analysis module 220 are implemented on an application server accessible by the user device. In addition, the data store 225 may be implemented as an external database separate from the application server and/or user device.

As discussed above, each configuration identified by the configuration generation module 210 may be associated with one or more configuration parameter sets defining dimensions and/or image component orientations. Therefore, for a given depth mapping device design, the arrangement of imaging components on rings is based upon the configuration for the device, while the dimensions and orientations are defined by the specific configuration parameter set associated with the configuration.

Figure 2B:
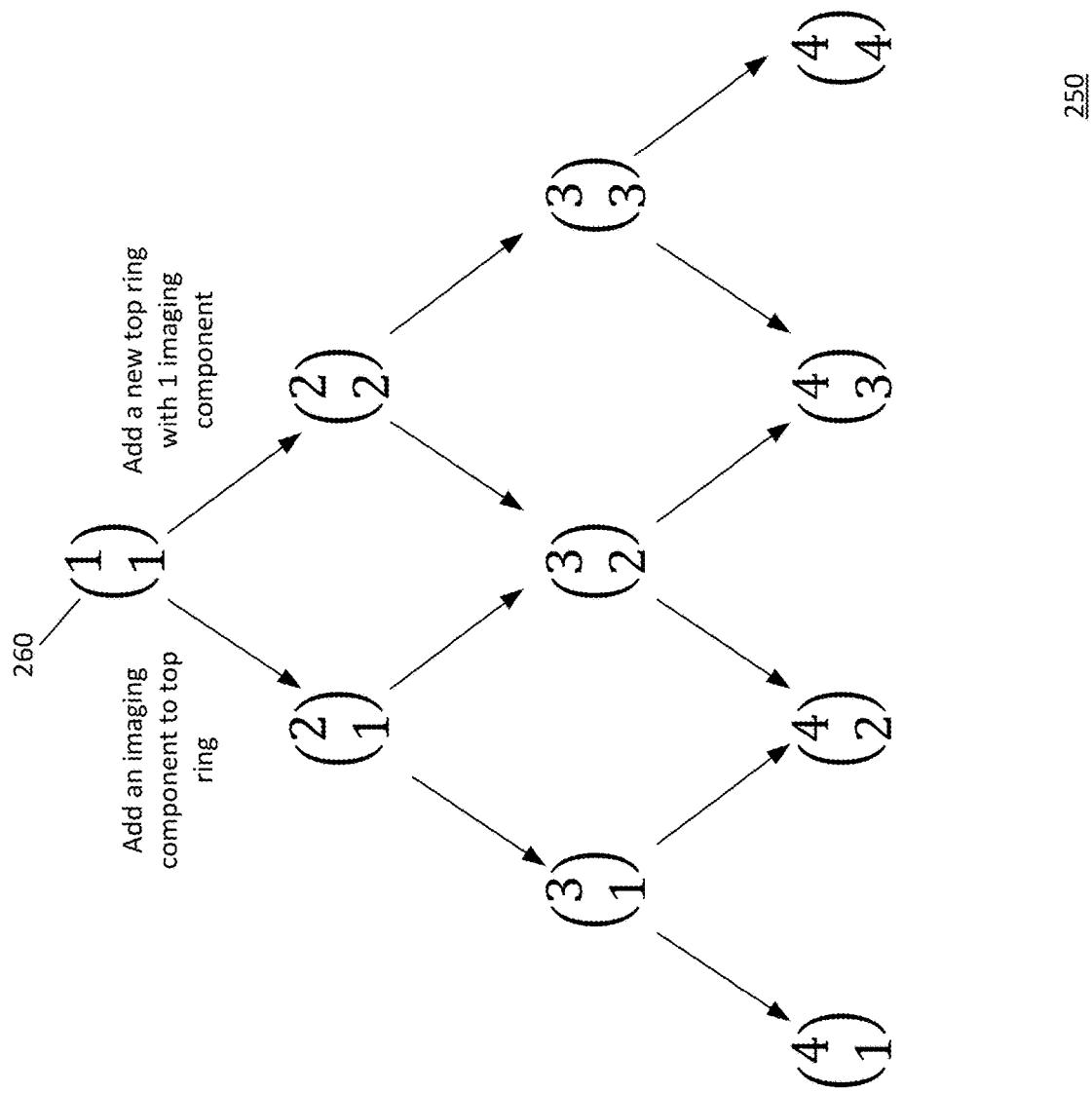
FIG. 2B illustrates a Pascal triangle that may be used to determine possible configurations for a given number of imaging components and rings, in accordance with some embodiments.

FIG. 2B illustrates a Pascal triangle 250 that may be used to determine possible configurations for a given number of imaging components and rings, in accordance with some embodiments. Each entry 260 in the Pascal triangle corresponds to a particular number of imaging components and number of rings, and is expressed in the format $$\binom{n}{k},$$

where n indicates a number of imaging components, and k indicates a number of rings. The possible configurations for each entry may be determined based upon the possible configurations of prior entries in the Pascal triangle, by adding a new extra imaging component to a particular ring (e.g., the top ring) of a configuration (left arrows) or adding a new ring (e.g., a new top ring) with one imaging component to a configuration (right arrows). For example, for $$\binom{1}{1},$$

one configuration (i.e., a single imaging component on a single ring) is possible. By adding a second imaging component to the top ring (resulting in two imaging components on a single ring), one possible configuration for $$\binom{2}{1}$$

is achieved. On the other hand, by adding a new top ring having one imaging component to obtain a configuration with two rings having one imaging component each, a configuration is $$\binom{2}{2}$$

are determined. As such, the use of a Pascal triangle structure allows for the possible configurations for a given number of imaging devices and rings to be easily enumerated using a recursive combinatorial algorithm.

Figure 2C:
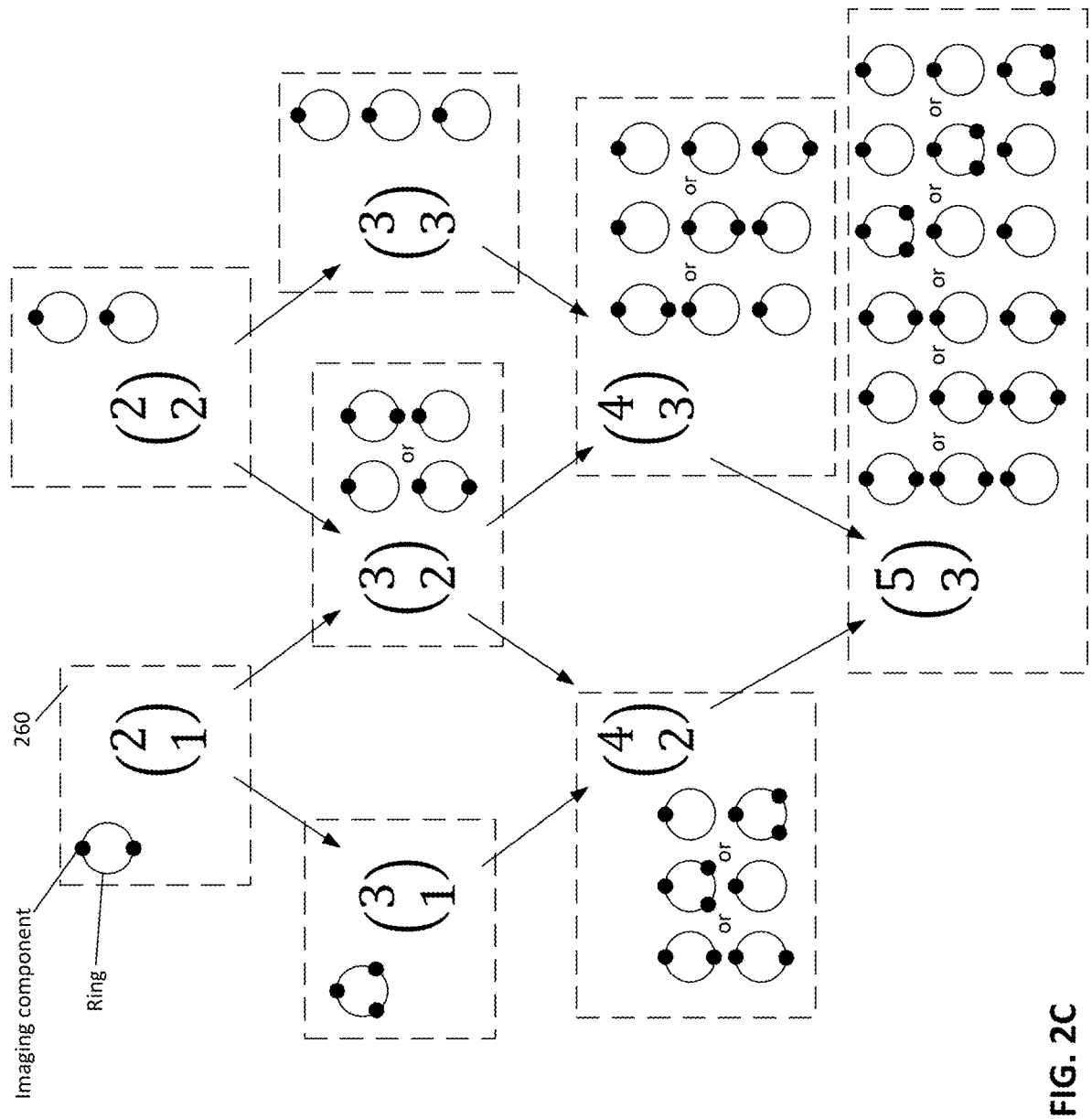
FIG. 2C illustrates how different possible configurations for a given combination of imaging components and rings can be determined using the Pascal triangle illustrated in FIG. 2B, in accordance with some embodiments.

FIG. 2C illustrates how different possible configurations for a given combination of imaging components and rings can be determined using the Pascal triangle illustrated in FIG. 2B, in accordance with some embodiments. FIG. 2C illustrates, as part of each $$\binom{n}{k}$$

entry 260, a diagram showing the possible configurations corresponding to the entry, with circles representing rings, and dots representing imaging components. For example, as discussed above, the entry $$\binom{2}{1}$$

has one possible configuration of one ring having two imaging components, and the entry $$\binom{2}{2}$$

has one possible configuration of two rings having one imaging component each. These configurations can be used to determine the possible configurations for $$\binom{3}{2},$$

comprising a first configuration with a top ring with two imaging components and a bottom ring with one imaging component, and a second configuration with a top ring with one imaging component and a bottom ring with two imaging components. These configurations were obtained by adding a new top ring with a single imaging component to the configurations of $$\binom{2}{1},$$

and adding a new imaging component to the top ring of the configurations of $$\binom{2}{2}.$$

Similarly, the two possible configurations for $$\binom{3}{2}$$

and one possible configuration for $$\binom{3}{3}$$

can be modified as described above and combined to determine three possible configurations for $$\binom{4}{3}.$$

The three possible configurations for each of $$\binom{4}{2}$$

and $$\binom{4}{3}$$

can be modified and combined to form six possible configurations for $$\binom{5}{3},$$

and so forth. It is understood that while FIGS. 2B and 2C illustrate a particular method for determining possible configurations for a given number of imaging components and rings, other techniques for determining possible configurations may also be used.

Figure 3:
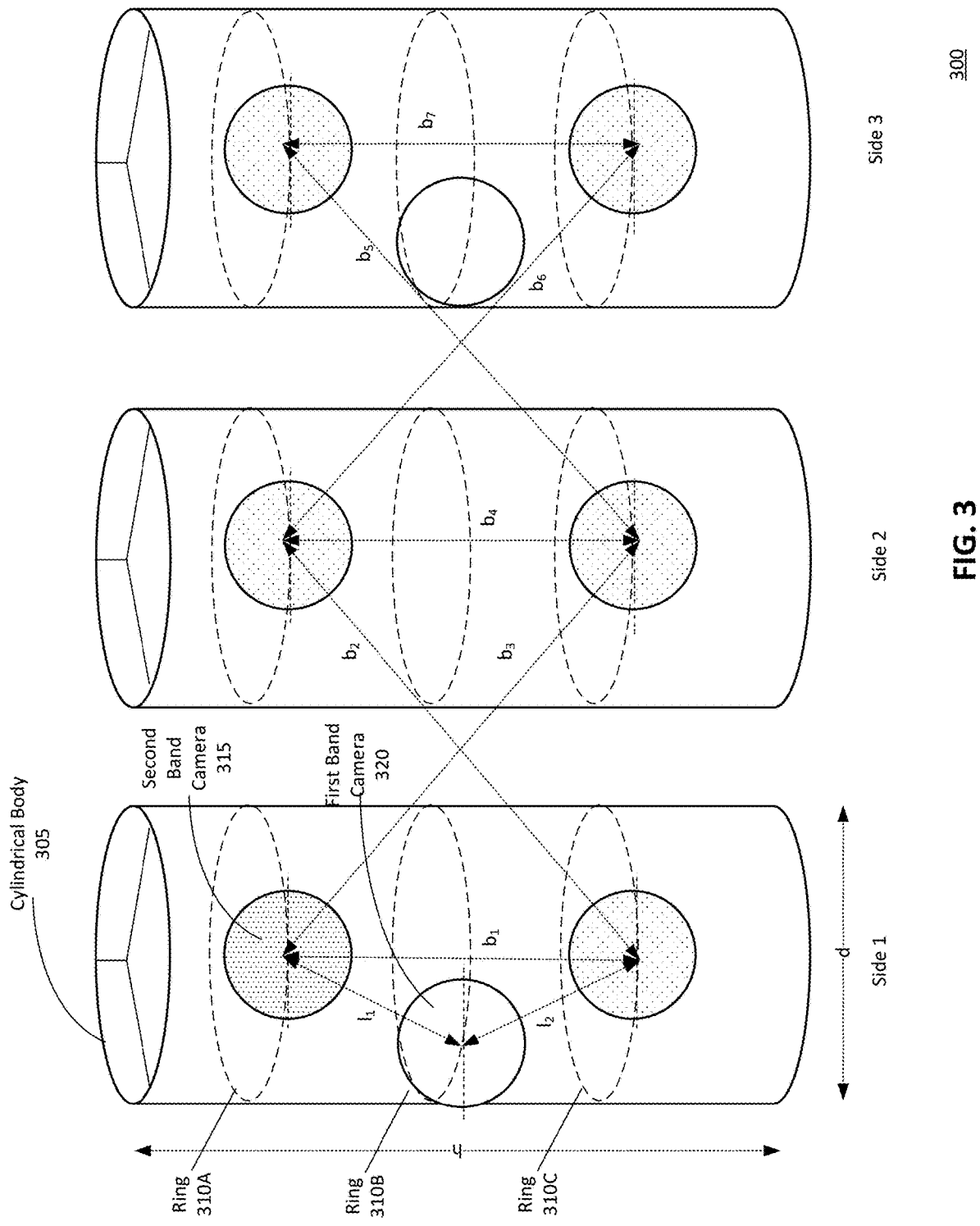
FIG. 3 illustrates a design for a depth mapping device based upon a configuration that may be generated by the configuration generation module of FIG. 2A in response to a received set of input parameters, in accordance with some embodiments.

FIG. 3 illustrates a design for a depth mapping device 300 based upon a configuration that may be generated by the configuration generation module 210 in response to a received set of input parameters, in accordance with some embodiments. The configuration illustrated in FIG. 3 may have been generated in response to input parameters specifying that depth mapping device 300 should include 2 first band cameras 320 (e.g., RGB cameras) distributed over a single ring 310B (spaced 180° apart), and 6 second band cameras 315 (e.g., IR cameras) distributed over 2 rings 310A, and 310C, and that the depth mapping device should have a height h and diameter d. As illustrated in FIG. 3, each of the rings 310A, 310B, and 310C is illustrated based upon a centerline of the ring, which represents a circumferential line intersecting a center of each imaging device on the ring. FIG. 3 illustrates three views of the cylindrical body 305 of the depth mapping device 300 having a diameter of d and a height of h, each view depicting 120° of the cylindrical body 305. The depth mapping device 300 has three rings, including a first ring 310A containing three second band cameras 315, a second ring 310B containing two first band cameras 320, and a third ring 310C containing three second band cameras.

The dimensions of the depth mapping device 300 may be defined by the configuration parameter set associated with the configuration. For example, the configuration parameter set may specify the distance between the rings of the depth mapping device 300, spacing and alignment of imaging components within each ring, orientation or tilt of imaging components, and/or the like. As illustrated in FIG. 3, the distances between the second band cameras 315 on the first and third rings 310A and 310B to the RGB cameras 320 on the second ring 310B are indicated by the lengths l (e.g., $l_1$ and $l_2$), which may be based upon the vertical distance between the second ring 310B and the first and third rings 310A and 310C, as well as the radial angle offset between the first band cameras 320 on the second ring 310B and the second band cameras 315 on the first and third rings 310A and 310C, as defined in the configuration parameter set. In addition, distances between second band cameras 315 on different rings are measured as baselines b (e.g., $b_1$ through $b_7$). Because the second band cameras 315 on the first and third rings 310A and 310C are radially aligned, the baselines $b_1$, $b_4$, and $b_7$ are equivalent to the vertical distance between the first ring 310A and third ring 310C, while the baselines $b_2$, $b_3$, $b_5$, and $b_6$ are based on the vertical distance between the first ring 310A and third ring 310C and the angle offset between the second band cameras 315 (e.g., 120°). It is understood that while FIG. 3 illustrates certain lengths l and baselines b, there are additional lengths and baselines between the imaging components illustrated in FIG. 3 not shown in the figure (e.g., between the components visible on side 3 and on side 1, due to side 3 wrapping back around to side 1).

The l and b values discussed above for the depth mapping device 300 depend upon the configuration parameter set used to produce the depth mapping device 300. For example, the configuration parameter set specifies the distances between the first, second, and third rings 310A, 310B, and 310C, as well as the angular offsets between the imaging components on each ring, which define the lengths l and baselines b. Different configuration parameter sets for the configuration specifying different distances between the rings 310 and/or different angular offsets will result in different l and b values, which may result in different amount of coverage that can be achieved by the configuration. For example, in some embodiments, larger baselines b may increase the accuracy of depth mapping performed using the second band cameras 315. On the other hand, a large baseline b may potentially reduce coverage if the distances between the second band cameras 315 cause a decrease in an amount of overlap between the fields of view of the second band cameras 315 at certain distances. In addition, the configuration parameter set may specify the orientation of the imaging components on each ring (e.g., tilt angles). In some embodiments, different tilt angles of the imaging components may shift the coverage of individual imaging components of the device, affecting the overall coverage of the depth mapping device.

Figure 4:
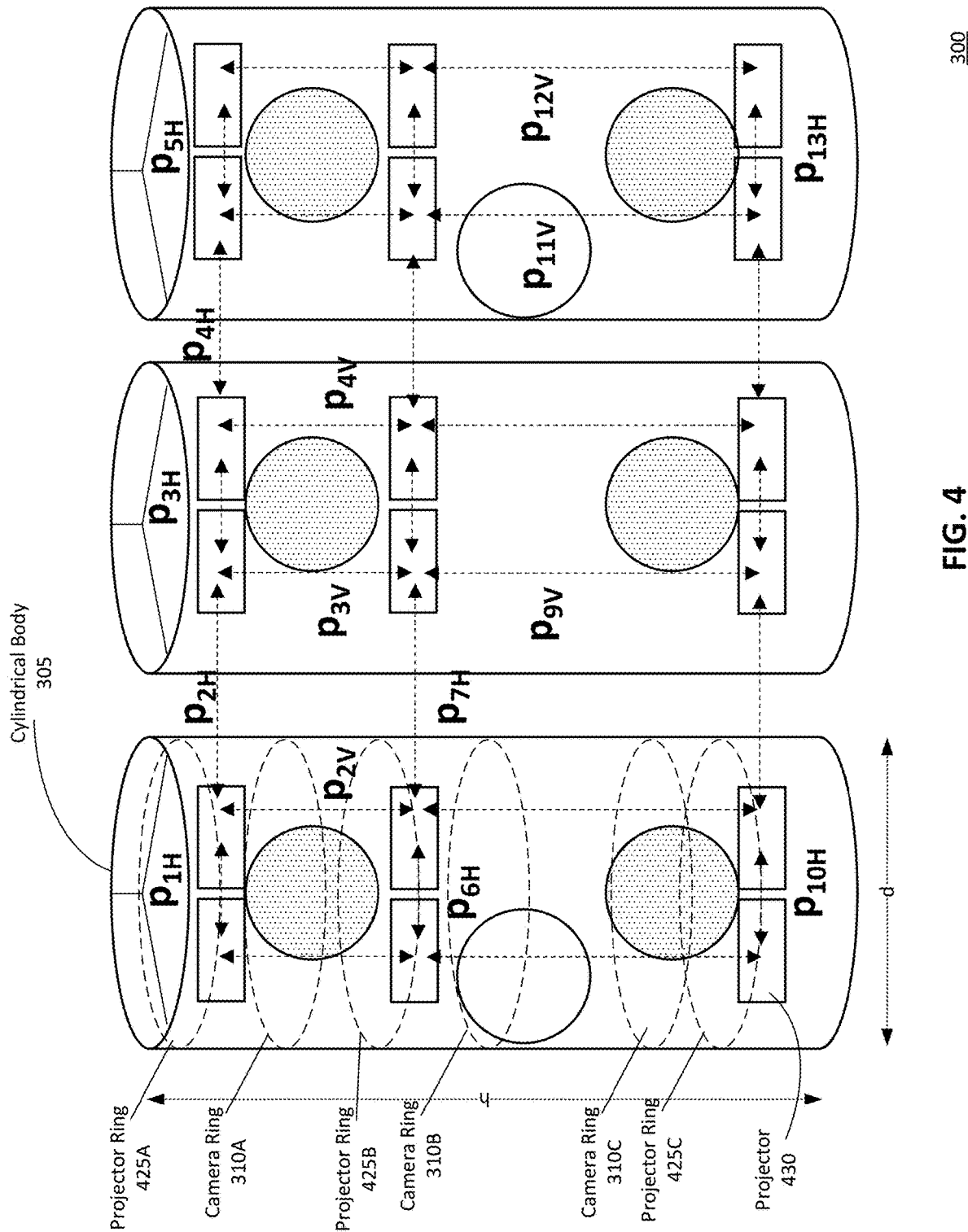
FIG. 4 illustrates the design of the depth mapping device of FIG. 3, with the addition of projector rings, in accordance with some embodiments.

FIG. 4 illustrates the design of the depth mapping device 300 of FIG. 3, with the addition of projector rings, in accordance with some embodiments. The configuration of the depth mapping device 300 illustrated in FIG. 4, in comparison to the depth mapping device 300 of FIG. 3, further comprises first, second, and third projector rings 425A, 425B, and 425C, each containing six projectors 430 grouped into three groups of two. By containing both camera rings and projector rings, the depth camera device is able to use its IR cameras to capture images of the local area onto which IR patterns have been projected, without the need for a separate projector system.

The configuration parameter set may specify parameter values that define the distances p separating the projectors 430 of the depth mapping device, where the distances $p_h$ (e.g., $p_{1h}$, $p_{2h}$, ...) correspond to horizontal distances between the projectors 430 on the same ring, and the distances $p_v$ (e.g., $p_{1v}$, $p_{2v}$, ...) correspond to vertical distances between the projectors 430 on different rings. For example, the configuration parameter set may specify that the six projectors 430 on each ring 425 are grouped into three groups of two projectors each, such that the distance separating the projectors 430 of each group (e.g., $p_{1h}$) are much less than the distance between the groups (e.g., $p_{2h}$). The configuration parameter set may further specify the distances $p_v$ between each of projector rings 425, the distances between the projector rings 425 and the camera rings 410 (not shown), and that each group of two projectors 430 on each ring 425 is vertically aligned with a corresponding IR camera 415 of the first and third camera rings 410A and 410C.

For the configurations illustrated in FIGS. 3 and 4, the configuration adjustment module 215 may generate different configuration parameter sets, which would result in different l, b, and p values. In addition, each of the configuration parameter sets may be evaluated by the coverage analysis module 220, which determines an amount of coverage that can be achieved by the particular configuration parameter set. By selecting a configuration parameter set for the configuration associated with the highest coverage, values for the dimensions l, b, and p are determined that would provide improved coverage for a depth mapping device design using the selected configuration.

In some embodiments, values of configuration parameters for a configuration parameter set may be subject to certain restrictions. For example, in some embodiments, the imaging components on each ring may be constrained to be evenly spaced around the ring, or be arranged in evenly-spaced groups. In some embodiments, the imaging components on a particular ring may be required to be at a uniform height, such that the vertical distance between the components on two different rings remains uniform.

In some embodiments, one or more constraints to be used when identifying possible configuration parameter sets for a configuration of the depth mapping device may be based upon one or more user-provided input parameters. For example, the input parameters specified by the user may specify a particular type of first band camera 320 having certain dimensions. As such, spacing between the camera ring 310B containing the first band cameras 320 and adjacent rings may be restricted to certain dimensions (e.g., at least a minimum dimension necessary to accommodate the size of the first band camera 320). In some embodiments, the type of imaging component may limit a number of imaging components that may be placed on a particular ring.

In some embodiments, in order to provide good coverage, each imaging component of the depth mapping device may face directly outwards away from the central axis of the cylindrical body of the depth mapping device (e.g., the x-axis of the local coordinate system overlaps with the radial axis, as described above in relation to FIG. 1A). In addition, each imaging component may be tilted towards or downwards in the vertical direction by a particular angle. As discussed above, an imaging component having a tilt angle of 0° is oriented horizontally (e.g., no y-axis rotation), while an imaging component having a positive tilt angle has a y-axis rotation in a first direction of the specified angle from a radial axis (e.g., upwards), and an imaging component having a negative tilt angle has a y-axis rotation of the specified angle in a second direction opposite the first direction (e.g., downwards).

For example, in an embodiments of the configuration illustrated in FIG. 4, the imaging components on the top, uppermost ring may each have a positive tilt angle (e.g., 50°). On the other hand, the imaging components middle ring may be each oriented horizontally (i.e., 0° tilt), and the imaging components on the bottom ring each have a negative tilt angle (e.g., −50°). In some embodiments, by analyzing the coverages of configuration parameter sets where the imaging components are titled different amounts, an improved coverage of the imaging components may be able to be determined.

As discussed above, the coverage of a depth mapping device may refer to a collective field of view of the imaging components of the depth mapping device. In some embodiments, the coverage of the depth mapping device is modelled based upon a virtual sphere (or other virtual object) surrounding a virtual representation of the depth mapping device located at the center of the virtual sphere. The coverage of the depth mapping device is based upon a portion of the surface of the virtual sphere that falls within a field of view of the cameras of the virtual depth mapping device. In some embodiments in which the depth mapping device comprises projectors for projecting light patterns and cameras configured to capture images from which the projected light patterns can be extracted, the coverage of the depth mapping device may be based on an overlapping field of view of the projectors and cameras of the depth mapping device (e.g., such that the projected light patterns can be extracted by the images captured by the cameras).

In some embodiments, the coverage of the depth mapping device design is assessed using a plurality of sample points placed at different locations on the surface of the virtual sphere. The coverage analysis module 220 determines, for each sample point, whether the sample point falls within the field of view of any imaging components of the depth mapping device. The coverage of the depth mapping device may be determined based upon a percentage of sample points that fall within the field of view of the imaging components of the depth mapping device. In some embodiments, different coverages for the depth mapping device may be calculated for different types of imaging components. For example, the depth mapping device may have a first band coverage indicating the coverage of the first band cameras of the depth mapping device, and a second band coverage indicating coverage of second band cameras.

In some embodiments, the overall coverage for a depth mapping device may be based upon an aggregation of a plurality of different coverage levels. Each coverage level for the depth mapping device may be based upon the portion of sample points on the virtual sphere that fall within the field of view of a certain number of imaging components of the depth mapping device. For example, the overall coverage for the depth mapping device may be based upon a first coverage level as determined by the coverage analysis module 220 that indicates the sample points on the virtual sphere that fall within a field of view of at least one imaging component (referred to as "1× coverage level"), a second coverage level indicating sample points that fall within a field of view of at least two imaging components ("2× coverage level"), and so forth.

Figures 5A, 5B:
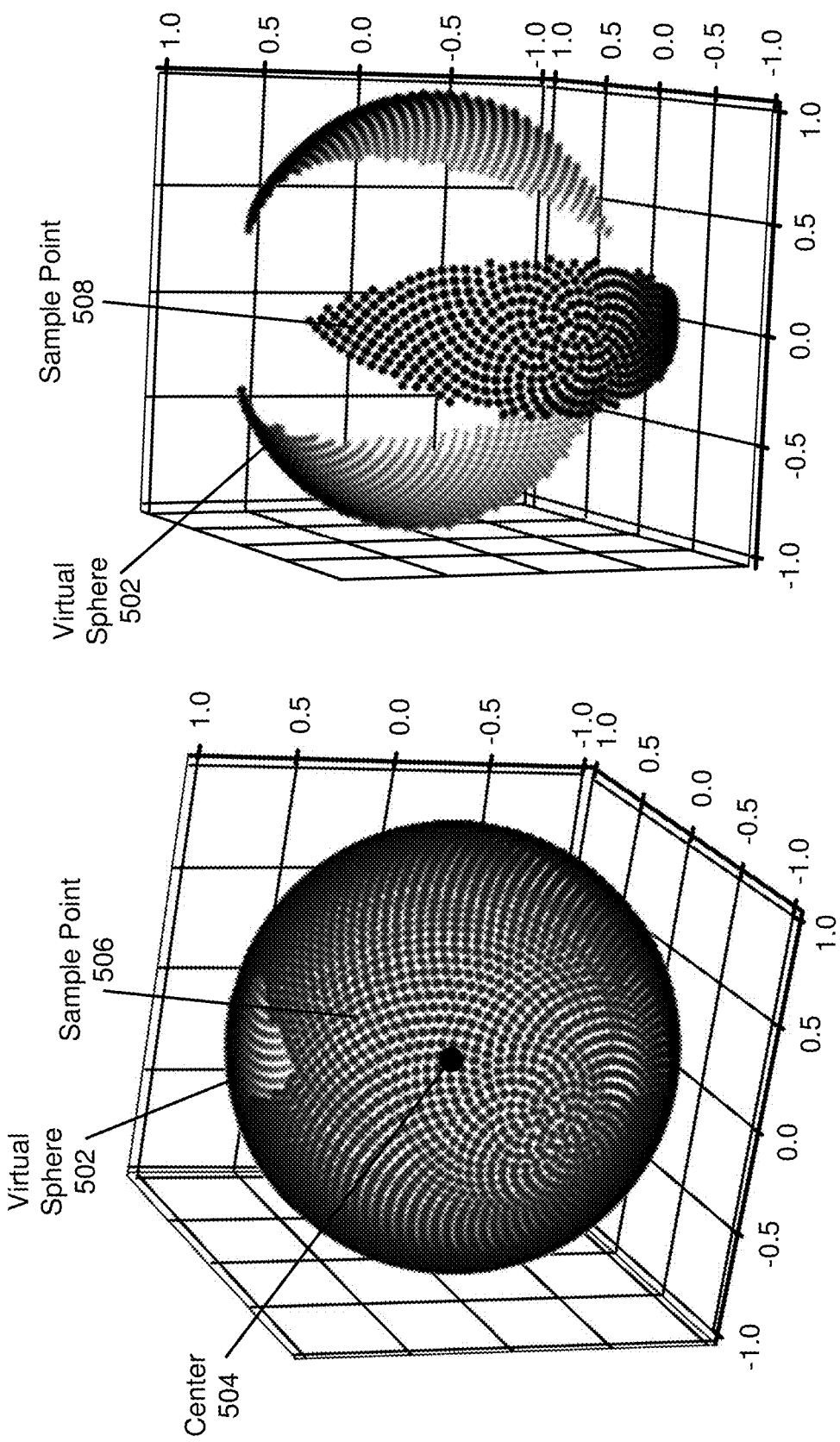
FIG. 5A is a graph illustrating 1× coverage level modelling for a depth mapping device having a particular configuration and configuration parameter set, in accordance with some embodiments.
FIG. 5B is a graph illustrating 2× coverage level modeling for the depth mapping device, in accordance with some embodiments.

FIGS. 5A and 5B illustrate graphs showing coverage level modelling for a depth mapping device having a particular configuration and configuration parameter set, in accordance with some embodiments. FIG. 5A is a graph illustrating the 1× coverage level for the particular configuration and configuration parameter set of the depth mapping device. The graph illustrates a virtual sphere 502 having a center 504 corresponding to a location of a virtual depth mapping device. Sample points on the virtual sphere 502 are analyzed to determine if they fall within a field of view of any of the imaging components of the depth mapping devices. The sample points 506 illustrated in FIG. 5A correspond to sample points on the virtual sphere 502 that are within a field of view of at least one imaging component of the depth mapping device. As such, the sample points 506 represent the 1× coverage level of the depth mapping device having the particular configuration and configuration parameter set. As illustrated in FIG. 5A, the sample points 506 cover a large portion of the virtual sphere 502, indicating a high level of 1× coverage.

FIG. 5B is a graph illustrating the 2× coverage level for the particular configuration and configuration parameter set of the depth mapping device. Each of the sample points 508 illustrated in FIG. 5B correspond to sample points on the virtual sphere 502 that are within a field of view of at least two imaging components of the depth mapping device. As such, the sample points 508 represent the 2× coverage level of the depth mapping device. Because every sample point that is within the field of view of at least two imaging components is also within the field of one imaging component, the sample points 508 representing the 2× coverage level of the depth mapping device will always be a subset of the sample points 506 representing the 1× coverage level illustrated in FIG. 5A. Because the fields of view of each imaging component of the depth mapping device may not always overlap with the fields of view of other imaging components, the 2× coverage of the depth mapping device may be smaller than the 1× coverage. For example, as illustrated in FIG. 5B, the 2× coverage of the depth mapping device having the particular configuration and configuration parameter set is less than half that of the 1× coverage. In some embodiments, in addition to 1× and 2× coverage levels, other coverage levels (e.g., 3× coverage levels) may also be determined.

The calculated coverage levels may be aggregated, e.g., as a weighted sum of the coverage levels. For example, the overall coverage may be calculated based upon a 1× coverage level having a weight of 100, a 2× coverage level having a weight of 1, and a 3× coverage level having a weight of 0.1. As such, a first depth mapping device configuration may have a higher overall coverage level compared to a second depth mapping device configuration if the first configuration has a higher 1× coverage level, even if the second configuration has a higher 2× coverage level. In some embodiments, 1× coverage level is prioritized and given higher weight, as having a higher 1× coverage level ensures that at least some depth information can be obtained for a larger portion of the local area. In some embodiments, one or more configuration parameter sets may be automatically discarded if the 1× coverage level associated with the configuration parameter sets does not reach at least a threshold value, without the need for additional analysis.

In some embodiments where different types are coverages are calculated (e.g., corresponding to different wavelength ranges, such an RGB coverage and an IR coverage), coverage levels may be determined for each type of coverage (e.g., 1×IR coverage, 2×IR coverage, etc.). Each type of coverage may weigh the different coverage levels differently. For example, in some embodiments RGB cameras are not used for determining depth information. As such, determining RGB coverage may place a high weight on 1× coverage, but low weight on 2× coverage and above. On the other hand, in embodiments that use IR cameras for determining depth information through triangulation, 1×, 2×, and 3× coverage may all be weighted heavily. As such, in determining coverages for a configuration, RGB coverage may be optimized for 1× coverage, while IR coverage is optimized for 2× and 3× coverage, In some embodiments, the sample points are evenly distributed over the surface of the virtual sphere 502. In other embodiments, the density of sample points may be different over different portions of the virtual sphere 502. For example, certain portions of the virtual sphere 502 (e.g., areas within a threshold angle of the horizontal equator of the virtual sphere 502) may be considered to be more important compared to other portions of the virtual sphere 502 (e.g., areas near the poles of the virtual sphere 502). As such, such portions of the virtual sphere 502 may contain a denser distribution of sample points, while other portions of the virtual sphere 502 (e.g., near the poles) will only have a sparser distribution of sample points.

In some embodiments, sample points may be associated with weight values for the purpose of calculating coverage levels. For example, sample points located in areas of the virtual sphere 502 deemed be more important (e.g., sample point within a threshold angle of the horizontal equator of the virtual sphere 502) may be weighed more heavily compared to sample points 506 located in areas considered less important for coverage (e.g., sample points near the poles of the virtual sphere 502).

In some embodiments, the sample points used to determine coverage may be based upon one or more of the input parameters received from a user. For example, the input parameters may specify a total number of sample points, a distribution of sample points over the virtual sphere 502, weight values for sample points at different locations on the virtual sphere 502, types of coverage levels to calculate and their respective weights (e.g., 1×, 2×, 3× coverage levels, IR coverage level, RGB coverage level, and/or the like).

FIG. 6 illustrates a flowchart of a process for producing a design for a depth mapping device, in accordance with some embodiments. The process of FIG. 6 may be performed by the design system 200. Other entities may perform some or all of the steps of the process in other embodiments. Likewise, embodiments may include different and/or additional steps, or perform the steps in different orders.

The design system 200 identifies 610 one or more depth mapping device configurations that satisfy a set of input parameters. Each identified configuration indicates a different arrangement of imaging components (e.g., cameras or projectors) among one or more rings of the depth mapping device design. For example, the input parameters may specify that the depth mapping device should have 6 first band cameras and between 4 and 6 second band cameras. The design system 200 may in response identify one or more configurations containing 6 first band cameras and 4 second band cameras arranged over a plurality of rings, and one or more configurations containing 6 first band cameras and 6 second band cameras arranged over a plurality of rings.

The design system 200 adjusts 620 the parameters of one or more of the identified configurations to adjust an amount of coverage associated with each configuration. In some embodiments, the design system 200 determines, for each identified configuration, one or more candidate configuration parameter sets for the configuration, each specifying a specific placement of the imaging components among the rings as specified by the configuration. In some embodiments, the design system 200 determines one or more parameter ranges for each of the configuration parameters, and steps through each parameter range to produce one or more configuration parameter values for constructing each configuration parameter set for the configuration.

In some embodiments, the design system 200 adjusts the level of coverage associated with a configuration by determining a coverage corresponding to each of the determined configuration parameter sets for the configuration, and selecting a configuration parameter set based upon the determined coverages (e.g., selecting the configuration parameter set having a highest coverage). In some embodiments, the coverage comprises an aggregation of one or more different coverage levels (e.g., a 1× coverage level, a 2× coverage level, etc.). In some embodiments, the design system may, upon selecting the configuration parameter set associated with the highest amount of coverage, identify one or more additional configuration parameter sets based upon the parameter values of the selected configuration parameter set, and determine if any of the additional configuration parameter sets are associated with a higher coverage. By selecting a configuration parameter set for the configuration determined to have the highest coverage, the coverage of the configuration may be maximized or increased.

The design system 200 selects 630 a target configuration from the one or more generated configurations, based upon the coverages corresponding to each of the configurations. In some embodiments, the design system may select a configuration associated with a coverage that exceeds a threshold value, rank the configurations by amount of coverage and select a configuration having the highest coverage, or some combination thereof.

The design system 200 generates 640 a depth mapping device design based upon the selected target configuration. In some embodiments, the selected design has the configuration parameter set associated with the target configuration previously determined to yield the highest coverage.

The design system 200 provides 650 provides the generated depth mapping device design to the user of the design system 200 and/or to a manufacturing system, such that a depth mapping device can be manufactured using the generated design. For example, the generated depth mapping device design may be presented to the user, saved to a design file, transmitted to a manufacturing system, etc. In some embodiments, the design system 200 may be part of the manufacturing system.

By generating a plurality of configurations and adjusting the parameters of each configuration to determine a coverage for the configuration, a configuration that satisfies the user's input and provides for a greatest amount of coverage may be obtained. By increasing (and in some cases maximizing) a coverage achieved by the manufactured depth mapping device, more accurate depth maps of the local area can be generated, leading to more accurate and immersive artificial reality environments.

Other Configurations

Although the above discussion primarily refers to depth mapping devices configured to have increased coverage over a local area (e.g., substantially 360° coverage), in some embodiments, a user may desire to construct depth mapping devices having different amounts of coverage. For example, in some embodiments, a depth mapping device may be configured to have coverage over a particular section of the local area, such as over a hemisphere (e.g., 180° coverage).

Figure 7:
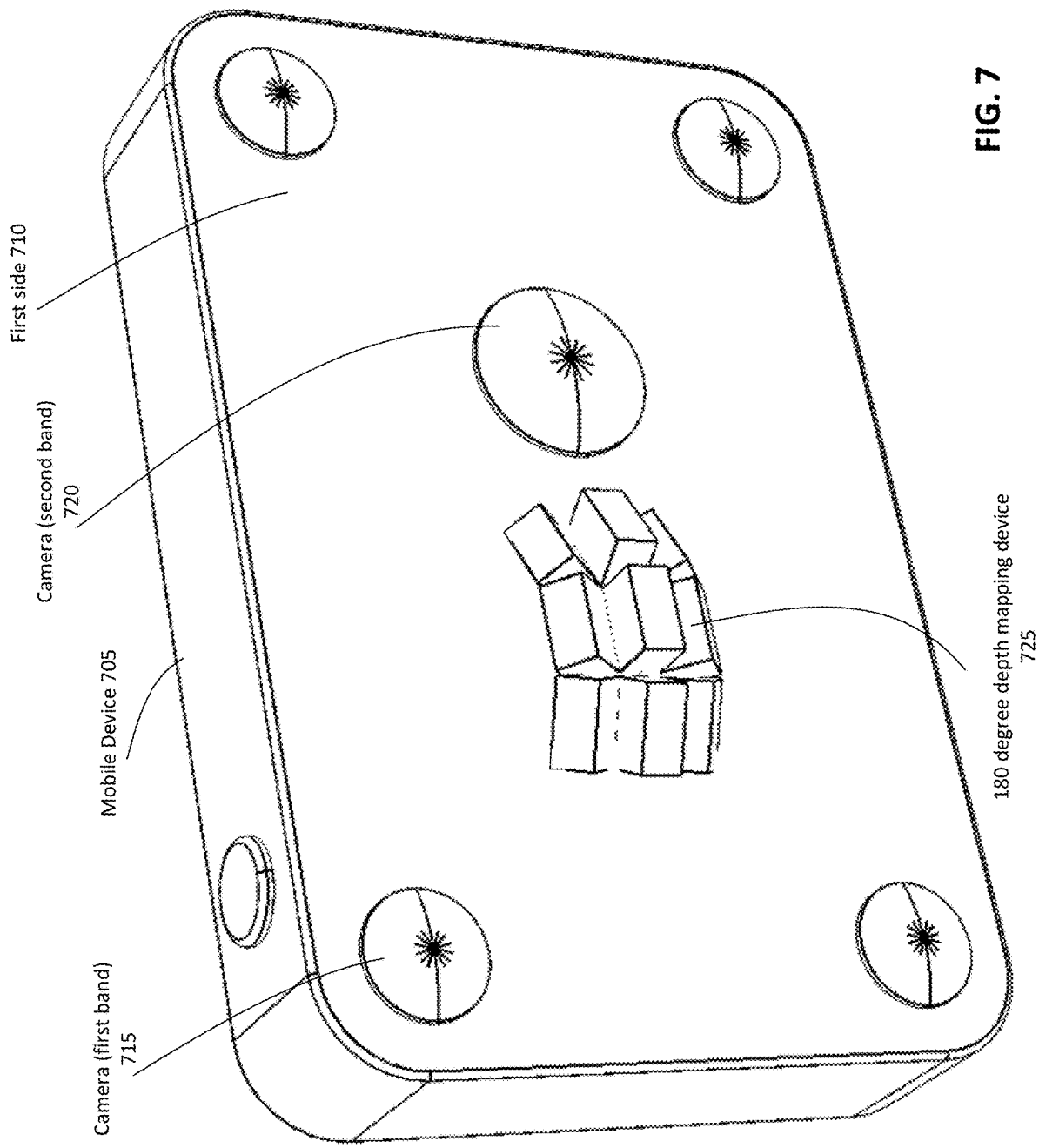
FIG. 7 illustrates a depth mapping device configured to have hemispherical coverage, in accordance with some embodiments.

FIG. 7 illustrates a depth mapping device 725 configured to have hemispherical coverage, in accordance with some embodiments. The depth mapping device 725 illustrated in FIG. 7 is implemented as part of a mobile device 705 having a first side 710. One or more imaging components are mounted on the first side 710, including a plurality of first cameras 715 and a second camera 720. In some embodiments, the first cameras 715 and second camera 720 may correspond to first and second wavelength bands, respectively. In some embodiments, the first cameras 715 may correspond to monochrome cameras, while the second camera 720 may correspond to an RGB color camera.

The first side 710 further includes a depth mapping device 725 comprising a plurality of projectors arranged among a plurality (e.g., three) 180° half-rings, and configured to project a light pattern over a hemisphere facing the first side 710. The configuration for adjusting the 180° coverage of the depth mapping device 725 can be determined in a manner similar that described above, based upon a 180° virtual hemisphere instead of a 360° virtual sphere. As such, the coverage of light patterns generated by the projectors of the depth mapping device 725 over the 180° hemisphere can be determined for different configurations of the projectors (e.g., distributions of the projectors over different rings).

In some embodiments, the coverage analysis module 220 may further analyze the coverage achieved by the placement of the first and second cameras 715 and 720 on the first side 710. For example, configuration generation module 210 may generate one or more configurations for the first and second cameras 715 and 720 on the first side 710 corresponding to different placements of the cameras, which may be analyzed by the coverage analysis module 220. In some embodiments, the coverage analysis module 220 does not analyze the coverage associated with the first and second cameras 715 and 720, or may analyze the coverage associated with the first and second cameras 715 and 720 on the first side 710 independently from the depth mapping device 725.

In some embodiments, the first cameras 715 are monochrome cameras configured to capture images of the local area facing the first side 710. In some embodiments, the light patterns projected by the depth mapping device 725 are extracted from the images captured first cameras 715, and used to determine depth information for the local area facing the first side 710. As such, the coverage of the first cameras 715 on the mobile device 705, for the purposes of depth mapping, depends upon the coverage of the projectors of the depth mapping device 725. On the other hand, the second camera 720 may be an RGB color camera configured to provide color information to the objects within the local area. As such, in some embodiments, the second camera 720 is not used to detect projected light patterns from the projectors of the depth mapping device 725, and the coverage of the second camera 720 may be independent of that of the depth mapping device 725. In other embodiments, the second camera 720 may also be configured to provide depth information.

In other embodiments, the depth mapping device 725 may comprise one or more cameras in addition to one or more projectors. For example, at least a portion of the first cameras 715 may, instead of being mounted on the first side 710 separately from the projectors of the depth mapping device 725, be located on one or more rings of the depth mapping device 725.

Additional Configuration Information

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method, comprising:
identifying a plurality of device configurations that satisfy a set of input parameters that includes a number of imaging components, each device configuration indicating a different arrangement of the number of imaging components among one or more rings of a depth mapping device design;
adjusting one or more parameters of one or more configurations of the plurality of configurations to adjust a coverage associated with each of the respective one or more configurations, wherein the coverage associated with a configuration of the one or more configurations is indicative of an amount of a local area viewable through the imaging components arranged in accordance with the configuration;
selecting a target configuration from the one or more configurations, based in part on a coverage associated with the target configuration; and
generating a depth mapping device design based upon the target configuration, wherein manufacture of a depth mapping device is based in part on the depth mapping device design.

2. The method of claim 1, wherein the set of input parameters further includes input parameters that are selected from a group consisting of: a number of first band cameras associated with a first wavelength band, a number of second band cameras associated with a second wavelength band that is different from the first wavelength band, a first band camera field of view, a second band camera field of view, a number of rings, and a number of projectors.

3. The method of claim 2, wherein the first band cameras correspond to red-green-blue (RGB) cameras, and the second band cameras correspond to infrared (IR) cameras.

4. The method of claim 1, wherein the set of input parameters further comprises a number of sample points, and wherein adjusting one or more parameters of one or more configurations of the plurality of configurations to adjust a coverage associated with each of the respective one or more configurations comprises:
calculating coverages for each of the one or more configurations using the number of sample points.

5. The method of claim 1, wherein one or more of the parameters are selected from a group consisting of: an angle of one or more imaging components on a particular ring, and an offset angle between two or more rings.

6. The method of claim 1, wherein adjusting the one or more parameters of the one or more configurations of the plurality of configurations to adjust the coverage associated with each of the respective one or more configurations comprises:
- identifying, for each parameter of the one or more parameters, a parameter range and a plurality of parameter values within the parameter range;
- generating one or more parameter sets based upon the identified parameter values for each parameter; and
- for each of the one or more parameter sets, determining a coverage for an associated configuration of the one or more configurations.

7. The method of claim 6, wherein determining the coverage for the associated configuration of a parameter set of the one or more parameter sets comprises:
- generating a set of sample points, each sample point corresponding to a different location on a virtual sphere surrounding the configuration;
- for each sample point of the set of sample points, determining whether the sample point is within a field of view of an imaging component of the configuration; and
- calculating the coverage based upon the sample points of the set of sample points determined to be within a field of view of an imaging component of the configuration.

8. The method of claim 7, wherein the set of sample points are evenly distributed over the virtual sphere.

9. The method of claim 7, further comprising generating a set of weights corresponding to the set of sample points, and wherein the coverage is based upon a weighted sum of the sample points determined to be within a field of view of an imaging component of the configuration.

10. The method of claim 1, wherein the coverage comprises a first coverage level indicating a portion of the local area viewable by at least one imaging component of the configuration, and a second coverage level indicating a portion of the local area viewable by at least two imaging components of the configuration, wherein the coverage comprises aggregating at least the first coverage level and the second coverage level based upon one or more corresponding coverage weight values.

11. A non-transitory computer-readable storage medium storing executable computer program instructions, the computer program instructions executable by a processor to perform steps comprising:
- identifying a plurality of device configurations that satisfy a set of input parameters that includes a number of imaging components, each device configuration indicating a different arrangement of the number of imaging components among one or more rings of a depth mapping device design;
- adjusting one or more parameters of one or more configurations of the plurality of configurations to adjust a coverage associated with each of the respective one or more configurations, wherein the coverage associated with a configuration of the one or more configurations is indicative of an amount of a local area viewable through the imaging components arranged in accordance with the configuration;
- selecting a target configuration from the one or more configurations, based in part on a coverage associated with the target configuration; and
- generating a depth mapping device design based upon the target configuration, wherein manufacture of a depth mapping device is based in part on the depth mapping device design.

12. The computer readable storage medium of claim 11, wherein the set of input parameters further includes input parameters that are selected from a group consisting of: a number of first band cameras associated with a first wavelength band, a number of second band cameras associated with a second wavelength band that is different from the first wavelength band, a first band camera field of view, a second band camera field of view, a number of rings, and a number of projectors.

13. The computer readable storage medium of claim 12, wherein the first band cameras correspond to RGB color cameras, and the second band cameras correspond to IR cameras.

14. The computer readable storage medium of claim 11, wherein the set of input parameters further comprises a number of sample points, and wherein adjusting one or more parameters of one or more configurations of the plurality of configurations to adjust a coverage associated with each of the respective one or more configurations comprises:
- calculating coverages for each of the one or more configurations using the number of sample points.

15. The computer readable storage medium of claim 11, wherein one or more of the parameters are selected from a group consisting of: an angle of one or more imaging components on a particular ring, and an offset angle between two or more rings.

16. The computer readable storage medium of claim 11, wherein the adjusting the one or more parameters of the one or more configurations of the plurality of configurations to adjust the coverage associated with each of the respective one or more configurations comprises:
- identifying, for each parameter of the one or more parameters, a parameter range and a plurality of parameter values within the parameter range;
- generating one or more parameter sets based upon the identified parameter values for each parameter; and
- for each of the one or more parameter sets, determining a coverage for an associated configuration of the one or more configurations.

17. The computer readable storage medium of claim 16, wherein the determining the coverage for the associated configuration of a parameter set of the one or more parameter sets comprises:
- generating a set of sample points, each sample point corresponding to a different location on a virtual sphere surrounding the configuration;
- for each sample point of the set of sample points, determining whether the sample point is within a field of view of an imaging component of the configuration; and
- calculating the coverage based upon the sample points of the set of sample points determined to be within a field of view of an imaging component of the configuration.

18. The computer readable storage medium of claim 17, wherein the set of sample points are evenly distributed over the virtual sphere.

19. The computer readable storage medium of claim 11, wherein the coverage comprises a first coverage level indicating a portion of the local area viewable by at least one imaging component of the configuration, and a second coverage level indicating a portion of the local area viewable by at least two imaging components of the configuration, wherein the coverage comprises aggregating at least the first coverage level and the second coverage level based upon one or more corresponding coverage weight values.

20. A design system comprising:
- a configuration generation module configured to identify a plurality of device configurations that satisfy a set of input parameters received via a user interface, the set of input parameters including a number of imaging components, each device configuration indicating a different arrangement of the number of imaging components among one or more rings of a depth mapping device design;
a configuration adjustment module and a coverage analysis module configured to:
adjust one or more parameters of one or more configurations of the plurality of configurations to adjust a coverage associated with each of the respective one or more configurations, wherein the coverage associated with a configuration of the one or more configurations is indicative of an amount of a local area viewable through the imaging components arranged in accordance with the configuration;
a coverage analysis module configured to select a target configuration from the one or more configurations, based in part on a coverage associated with the target configuration; and
a design generator module configured to generate a depth mapping device design based upon the target configuration, wherein manufacture of a depth mapping device is based in part on the depth mapping device design.

* * * * *

UNITED STATES PATENT AND TRADEMARK OFFICE
CERTIFICATE OF CORRECTION

PATENT NO. : 10,529,087 B1
APPLICATION NO. : 15/975281
DATED : January 7, 2020
INVENTOR(S) : Frank Joris Maria Jan Dellaert et al.

Page 1 of 1

It is certified that error appears in the above-identified patent and that said Letters Patent is hereby corrected as shown below:

On the Title Page

In the Title (54), and in the Specification at Column 1, Line 1, delete "SYSTEM FOR A DEPTH MAPPING DEVICE" and insert -- DESIGN SYSTEM FOR A DEPTH MAPPING DEVICE --

Signed and Sealed this
Eighth Day of December, 2020

Andrei Iancu
*Director of the United States Patent and Trademark Office*